US012152383B2

(12) United States Patent
Gilstrap

(10) Patent No.: US 12,152,383 B2
(45) Date of Patent: *Nov. 26, 2024

(54) WIDTH-SELECTABLE PIPE FLASHING PIECE AND METHOD OF USE

(71) Applicant: Mark Gilstrap, Monroe, WA (US)

(72) Inventor: Mark Gilstrap, Monroe, WA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/748,731

(22) Filed: May 19, 2022

(65) Prior Publication Data

US 2022/0275636 A1 Sep. 1, 2022

Related U.S. Application Data

(63) Continuation-in-part of application No. 16/687,543, filed on Nov. 18, 2019, now Pat. No. 11,448,344.

(51) Int. Cl.
*E04B 1/16* (2006.01)
*E04B 1/66* (2006.01)

(52) U.S. Cl.
CPC ...................................... *E04B 1/66* (2013.01)

(58) Field of Classification Search
CPC ........... E04B 1/66; E04D 13/1476; F16L 5/02
See application file for complete search history.

(56) References Cited

U.S. PATENT DOCUMENTS

| 4,280,305 A | | 7/1981 | Logsdon | |
|---|---|---|---|---|
| 4,333,660 A | * | 6/1982 | Cupit | ................. E04D 13/1476 52/60 |
| 4,864,782 A | | 9/1989 | Hasty | |
| 5,222,334 A | * | 6/1993 | Hasty | ................. E04D 13/1476 52/219 |
| 5,309,579 A | * | 5/1994 | Nelson | .................... E03D 11/16 285/46 |
| 5,588,267 A | * | 12/1996 | Rodriguez | .......... E04D 13/1476 285/4 |

(Continued)

FOREIGN PATENT DOCUMENTS

| DE | 3915007 A1 | | 11/1990 | |
|---|---|---|---|---|
| EP | 2063163 A1 | * | 5/2009 | ........... E04D 12/002 |
| FR | 3031790 A1 | | 7/2016 | |

OTHER PUBLICATIONS

The International Search Report and the Written Opinion of the International Searching Authority (Australia) of PCT/US2020/060878, Feb. 16, 2021.

*Primary Examiner* — Eugene G Byrd
(74) *Attorney, Agent, or Firm* — Kolitch Romano Dascenzo Gates LLC

(57) ABSTRACT

A flashing piece, having an outer portion, defining an opening and made of a first polymeric material and an inner portion, joined to the outer portion about the opening and extending across and covering the opening. Also, the inner portion is made of a second polymeric material that is more flexible and elastic than the outer material and is in most places of a first thickness and further defines indented rings wherein the second polymeric material is sufficiently thinner than the first thickness to enable an installer to begin a tear by broaching an indented ring, thereby creating a flap of the second polymeric material, and then to propagate the tear about the indented ring by pulling on the resultant flap of the second polymeric material.

14 Claims, 7 Drawing Sheets

(56) References Cited

U.S. PATENT DOCUMENTS

| | | | | |
|---|---|---|---|---|
| 6,543,186 | B2* | 4/2003 | Gilleran | E03C 1/02 |
| | | | | 52/220.8 |
| 6,860,070 | B2 | 3/2005 | Gilleran | |
| 8,209,923 | B1* | 7/2012 | Rich | E04D 13/1476 |
| | | | | 454/366 |
| 8,608,206 | B2* | 12/2013 | Fedale, Sr. | E04D 13/1407 |
| | | | | 285/43 |
| 9,255,412 | B2* | 2/2016 | Haynes | E04D 13/1407 |
| D796,014 | S* | 8/2017 | Haynes | D23/269 |
| 9,863,557 | B2* | 1/2018 | Haynes | F16L 5/10 |
| 10,822,815 | B1* | 11/2020 | Vance | F16L 5/10 |
| 2014/0084549 | A1* | 3/2014 | Haynes | F16L 5/10 |
| | | | | 277/606 |
| 2015/0323103 | A1* | 11/2015 | Coscarella | F16L 5/10 |
| | | | | 277/606 |
| 2017/0059061 | A1* | 3/2017 | Haynes | E04B 1/6813 |
| 2017/0159296 | A1* | 6/2017 | Vowles | E04D 13/1476 |
| 2018/0112410 | A1* | 4/2018 | DeGraan | E04D 13/1473 |
| 2018/0209205 | A1* | 7/2018 | Gilleran | H02G 3/10 |
| 2019/0093795 | A1 | 3/2019 | Haynes | |
| 2020/0052473 | A1* | 2/2020 | Gilstrap | H01R 13/73 |
| 2021/0148489 | A1 | 5/2021 | Gilstrap | |

\* cited by examiner

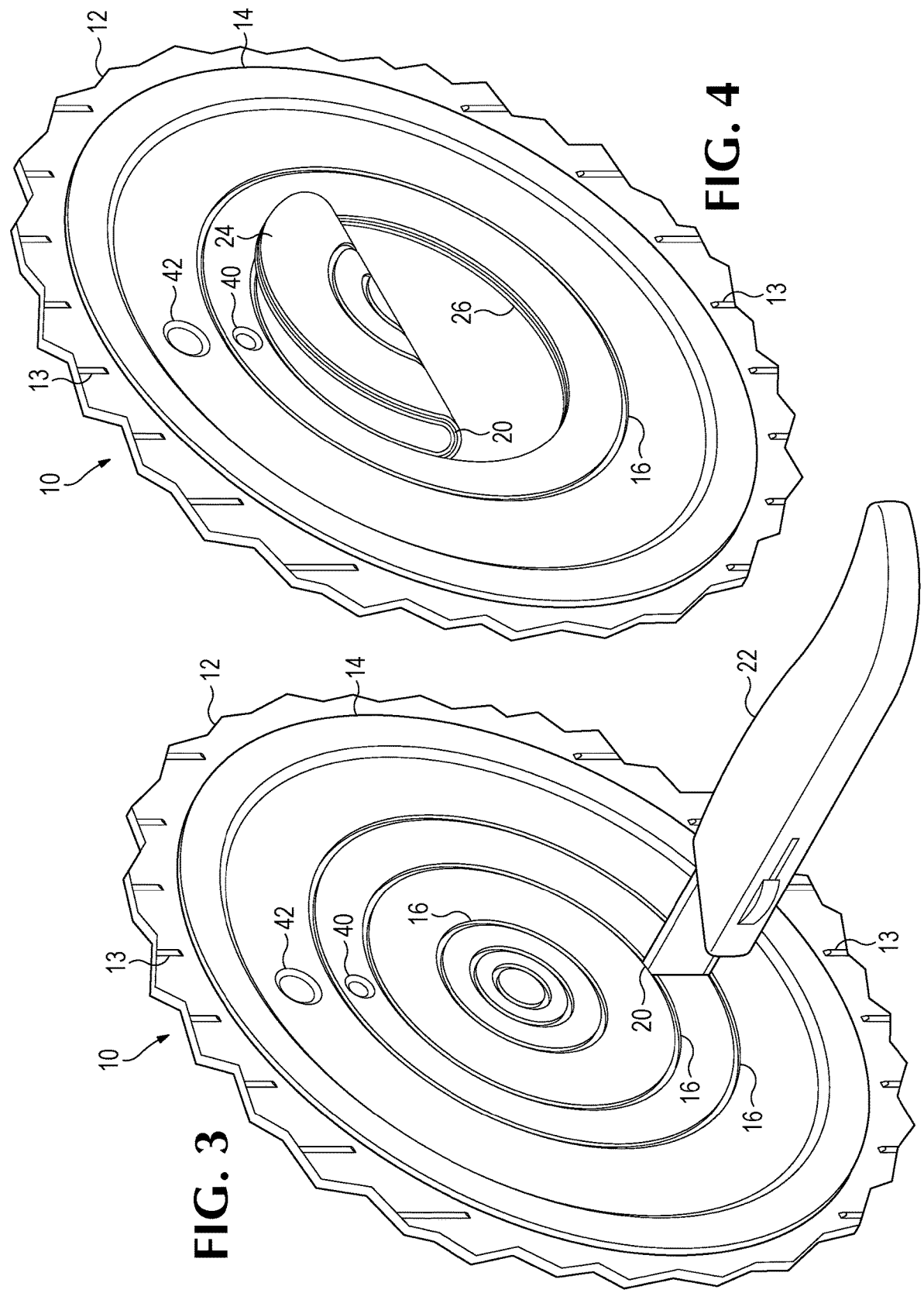

WIDTH-SELECTABLE PIPE FLASHING PIECE AND METHOD OF USE

RELATED APPLICATION

This application is a continuation-in-part of application Ser. No. 16/687,543 filed on Nov. 18, 2019, and which incorporated by reference, as if fully set forth herein.

BACKGROUND OF THE INVENTION

A modern building structure is constructed with an exterior cladding, or primary weather barrier, that provides a first line of defense against the elements and, also provides a good appearance for the building structure. Interior to and generally supporting the exterior cladding there is a building frame, typically made of dimensioned lumber (longitudinal elements) mechanically attached together, with sheets of plywood or particle board mechanically attached to the exterior side of these longitudinal elements. The dimensioned lumber may go by industry standard terminology of 2 by 4 s, 2 by 6 s, 2 by 8 s, or even wider elements, depending on the load that must be born, and other factors. Wall board is typically mechanically fastened to the interior side of the longitudinal elements, thereby defining a "wall cavity" between the exterior sheathing and the interior wall board. A secondary weather barrier, that is generally water resistant and is typically made of polymer sheeting, such as Tyvek®, or building paper, is mechanically attached to the building frame. These sheets are generally arranged as shingles are, with each upper piece of sheeting overlapping on the outside of the sheeting immediately below. With this arrangement water does not have any chance of penetrating through to the wall cavity of the building as it flows downward.

A modern house typically has at least one water pipe leading from outside the house, to inside, to deliver water to the house, and frequently also has a gas pipe leading into the house. Homes have low voltage cables (phone, television, alarms, cameras, internet or ground wires) which also pass through the exterior sheathing causing a breach in the cladding. Also, some forms of air conditioning include pipes carrying cold water from outside to inside the house. Every place where a pipe or cable must pass from outside to inside represents a breach in the cladding of the house, which must be carefully addressed to avoid ingress of water into the wall cavity. To avoid this occurrence, it is typical to employ a flashing piece that defines a hole sized to fit snugly about the pipe. The flashing piece may have a frame of stiffer material, with more flexible material defining the hole, so that the flexible material grips the pipe sufficiently so that water cannot flow through the hole (about the pipe) into the wall cavity.

Any flashing piece that has a pre-defined hole size, however, is limited to pipe of a specific diameter. This complicates materials stocking, because wholesalers and installers must keep on-hand multiple sizes in order to accommodate different pipe sizes. Also, with a flat front surface of the flashing piece, there is a possibility of the exterior cladding abutting and thereby stopping the flow of water down the sheeting of the secondary weather barrier.

SUMMARY OF INVENTION

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a flashing piece, having an outer portion, defining an opening and made of a first polymeric material and an inner portion, joined to the outer portion about the opening and extending across and covering the opening. Also, the inner portion is made of a second polymeric material that is more flexible and elastic than the outer material and is in most places of a first thickness and further defines indented rings wherein the second polymeric material is sufficiently thinner than the first thickness to enable an installer to begin a tear by broaching an indented ring, thereby creating a flap of the second polymeric material, and then to propagate the tear about the indented ring by pulling on the resultant flap of the second polymeric material.

In a second separate aspect, the present invention may take the form of a method of installing a pipe during the construction of a structure having walls, including a primary weather barrier, a secondary weather barrier and framing, at the point where the framing has been at least partially completed, through a hole in a the wall, so as to not permit water to enter the structure past the secondary weather barrier, including through the hole in the wall about the pipe. The method utilizes a flashing piece that has an outer portion, defining an opening and made of a first polymeric material and an inner portion, joined to the outer portion about the opening and extending across and covering the opening. Also, the inner portion is made of a second polymeric material that is more flexible and elastic than the first polymeric material and is in most places of a first thickness and further defines indented rings wherein the second polymeric material is thinner than the first thickness. In the method, the pipe is partially installed, so that it has a free end extending through the framing. One of the indented rings is broached, to create a tear along the indented ring, thereby creating a flap of the second polymeric material and then the tear is propagated about the indented ring by pulling on the flap until the tear extends all the way around the indented ring and removing the resultant disk of second polymeric material inside the indented ring, thereby creating a through-hole. The through-hole is placed about the pipe and the outer portion is attached to the framing.

In a third separate aspect, the present invention may take the form of a pipe installation, including a wall that has an exterior weather barrier, defining a through-hole and an interior weather barrier, including a frame and a layer of fluid impenetrable sheets, over the frame. Also, a flashing piece is joined to the frame, and has an outer portion, defining an opening and made of a first polymeric material and an inner portion, made of a second polymeric material that is more flexible and elastic than the outer material, joined to the outer portion about the opening and extending across and partially covering the opening. Also, the inner portion defines a first through-hole and a second through-hole. Finally, a pipe, extends through the first through-hole and a wire, extends through the second through-hole.

BRIEF DESCRIPTION OF DRAWINGS

Various embodiments of the invention are disclosed in the following detailed description and accompanying drawings.

FIG. 3 is an isometric view of the flashing of FIG. 1, being broached by a utility knife.

FIG. 4 is an isometric view of the flashing of FIG. 1, with a section being removed.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some, or all, of these specific details. For the purpose of clarity, technical material that is known in the technical fields related to the invention has not been described in detail so that the invention is not unnecessarily obscured.

Figure 1:
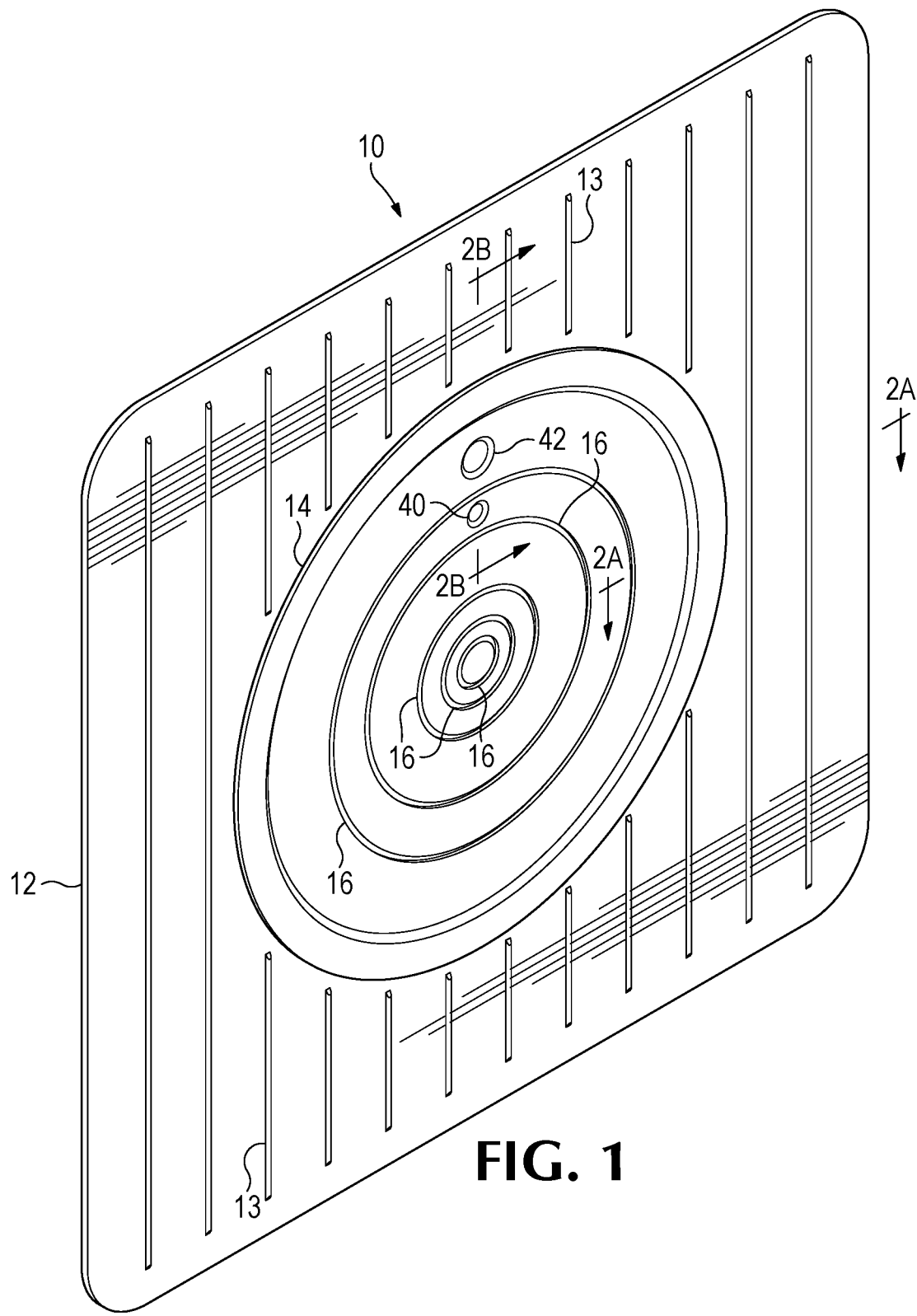
FIG. 1 is an isometric view of a piece of flashing, according to the present invention.
Figure 2A:
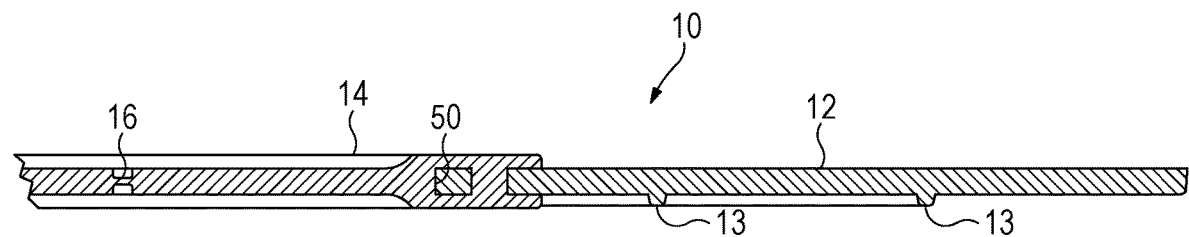
FIG. 2A is a sectional view of the piece of flashing of FIG. 1, taken along line 2A-2A of FIG. 1.
Figure 2B:
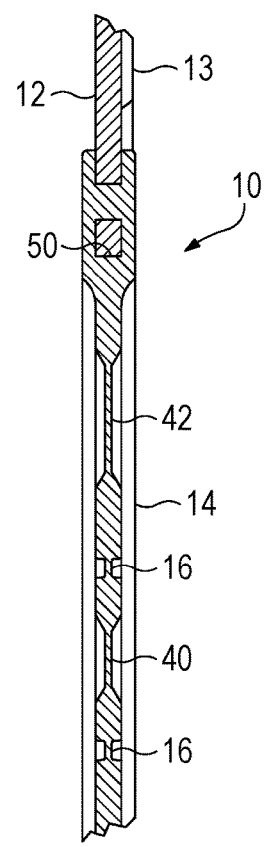
FIG. 2B is a sectional view of the piece of flashing of FIG. 1, taken along line 2B-2B of FIG. 1.

Referring to FIGS. 1 and 2, an embodiment of a flashing piece 10 includes a rigid panel 12, that defines a set of raised ribs 13, which form water channels therebetween. In some cases, the outer weather barrier of a wall may contact the front face of panel 12, and if not for ribs 13 could block the downward flow of water. Further, panel 12 supports a circular (inner) portion 14 that is made of an elastic material. In a preferred embodiment portion 14 is made from a thermoplastic elastomer (TPE) and more specifically may be a thermoplastic vulcanizate (TPV). In a more specific embodiment, the material of inner portion 14 may be an ethylene propylene thermoplastic rubber (EPTR). In one preferred embodiment the material of portion 14 has an elongation at break, as determined by ASTM D412 of between 250% and 380%. Further, in a preferred embodiment this material may have a flame rating (1.5 mm), H-B (horizontal burn) are "self-extinguishing" in the UL 94 rating scheme. Further, the inner portion 14 material is supple, with a Shore A rating of between 30 and 40, and in one embodiment 35. Also, it has a service temperature range from −60° C. to 135° C.

Figure 5:
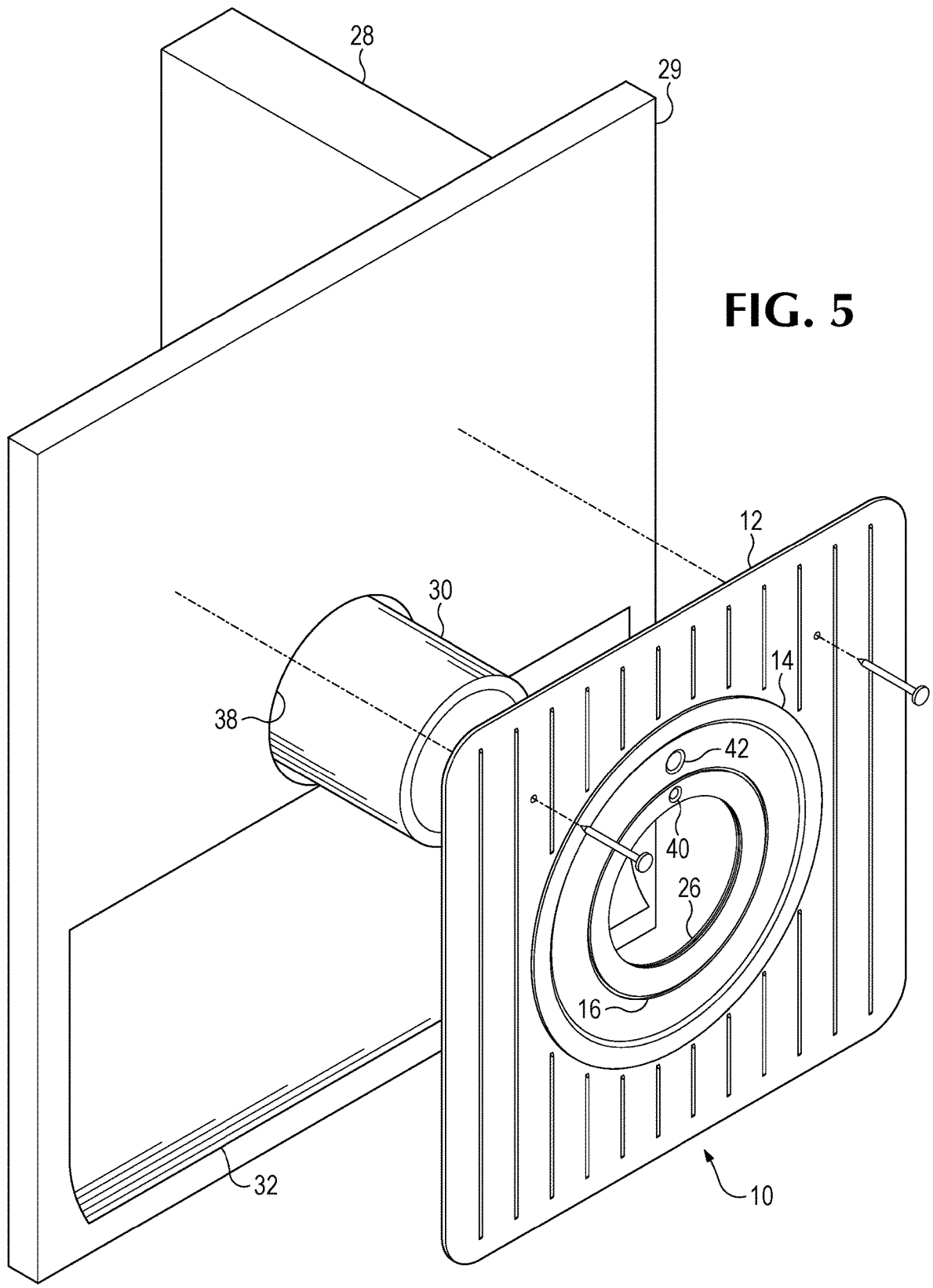
FIG. 5 is an isometric view of the flashing of FIG. 1, being installed onto a partially constructed wall, about a pipe.
Figure 6:
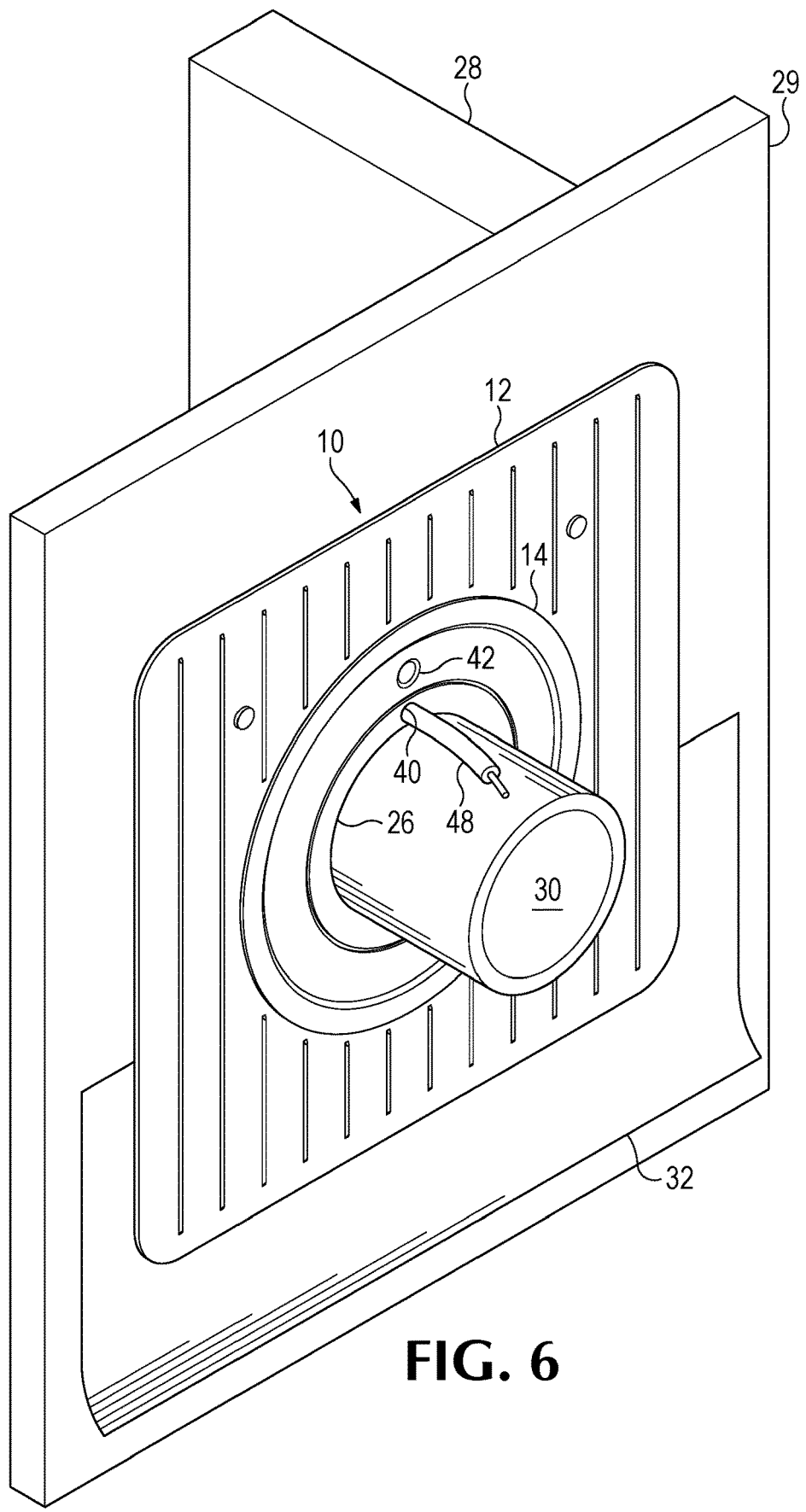
FIG. 6 is an isometric view of the flashing of FIG. 1, installed onto the partially constructed wall, and about the pipe of FIG. 5, and also having a ground wire, penetrating the piece of flashing.
Figure 7:
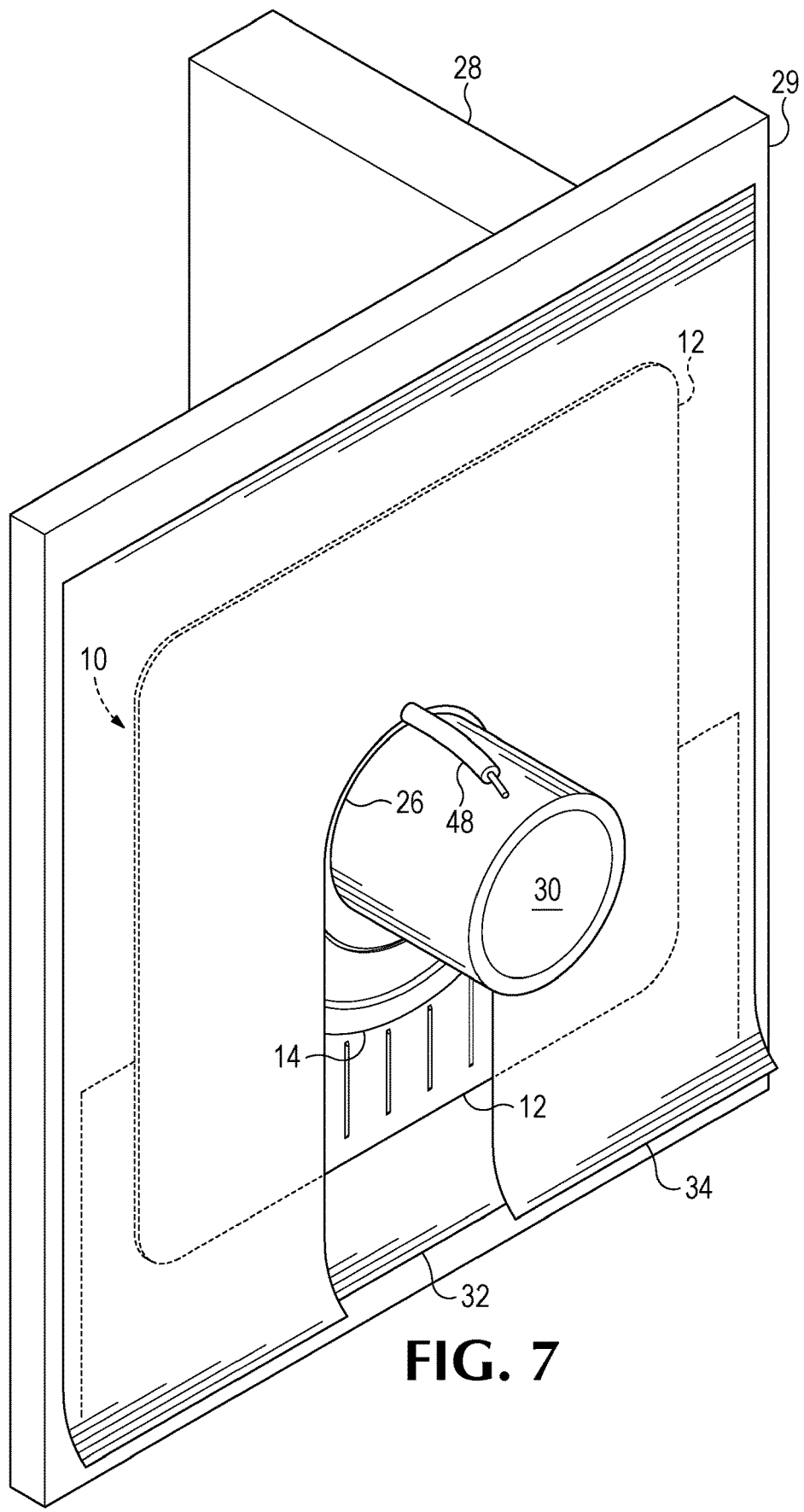
FIG. 7 is an isometric view of the partially constructed wall of FIG. 5, incorporating the flashing piece of FIG. 1, at a further stage of construction.

A set of indented rings 16 are defined in portion 14. As shown in FIGS. 3 and 4, each of these permit an installer to start a tear 20, using a knife 22. Notably, a tear along a ring 16 may also be started by a user's fingernail, a screwdriver, or any other reasonably sharp object. Because a workman may not always have a knife within easy reach, the capability to start a tear with an object that is not a knife greatly eases the task of installation. Tear 20 may then be easily propagated by pulling on the detached flap 24, until the tear 20 propagates along the entire circle, detaching the flap 24 (now a circular piece). Flashing piece 10 now defines a through-hole 26 sized according to the need of the installer. Referring to FIG. 5, the installer is now set to secure panel 12 onto a structural support, in the form of a framing timber 28, such as a 2×4, or a sheathing element 29 and, as shown in FIG. 6, to extend a pipe 30 through the through-hole 26. At this stage the bottom portion of panel 12 extends over a liquid impermeable sheet 32, such as a polymeric sheet. Referring to FIG. 7, an additional liquid impermeable sheet 34 may then be installed to drape over most of flashing piece 10 (except where prevented by pipe 30), to create a full secondary weather barrier.

It may be noted that there are at least two different forms of construction, open-frame construction, where sheathing 29 would not be present, and sheathed wall construction, having sheathing 29. Sheathing 29 forms a part of the frame, and if it is present, panel 12 would typically be secured onto the sheathing 29, which would also have a sheathing through-hole 38 (FIG. 5) created to accommodate the pipe 30. As shown in FIGS. 5, 6 and 7, pipe 30 is supported by a fixed pipe section (not shown). After the stage shown in FIG. 7, an exterior weather barrier is constructed of any one of a number of different materials, such as brick, shingle siding, wood, etc. A hole is left for pipe 30 to extend through. In some cases, pipe 30 is connected to an exterior fixed pipe and is fit through through-hole 26 from the outside.

It is generally advantageous, in the use of a flashing piece 10 to choose a ring 16 that defines an inner space slightly smaller than the diameter of the pipe 30 to be placed through piece 10. The elastomeric nature of the material of inner portion 14 will permit stretching, so that the pipe will be accommodated, and this stretching will create a tight seal about pipe 30.

In the case of gas pipes, it is common to have a grounding wire installed in association with the pipe. To accommodate such a wire, a thinned, easily broached round spot 40 of portion 14 is provided. In alternative embodiments spot 40 is oval or ellipsoid. The entire area of spot 40 is thinned, as opposed to the circular outlines of indented rings 16. Spot 40 also permits a workman to push a low voltage cable through the elastic material (such as for a phone, television, alarms, cameras, internet or ground wires) without first cutting a through-hole in flashing piece 10. The elastic material of portion 14 seals around a cable or cables, thereby providing superior protection against water ingress at the point of entry for a cable or cables. Often spot 40 will be used as an entry point for a cable that is not associated with any pipe entering through portion 14. It is notable that the sides of thinned spots 40 taper inwardly from the full thickness section of portion 14 to the fully thinned center area of spot 40. This permits the accommodation of wires and cables having varying thicknesses, with a thick cable being hugged by the thicker, tapering portions near the perimeter of thinned spot 40, and a thinner wire piercing only in the thinned area, and being hugged by the material around that wire. Typically, the grounding wire shown in FIG. 6, will be present at the point in the construction process shown in FIG. 5. An upper push-through spot 42 is also provided. In one preferred embodiment, a first one of push-through spots 40 and 42 is slightly smaller than the other and can accommodate low voltage wires, CATS, copper ground wire and a coax cable, whereas the larger push-through spot can also accommodate 14 AWG, 12 AWG wire, and, ¼", ⅜" copper wire. In an alternative preferred embodiments, additional spots 40 are provided to provide access points for additional cables, or one or both of push-through spots 40 and 42 are not present.

Rigid panel 12 may be made of polyvinyl chloride or polyamide, or any other material that is rigid enough to stay in place after being secured into a structural support. Circular portion 14 may be made of silicone rubber or similar rubbery, gripping material, having some elasticity to accept and grip a pipe. Both rigid panel 12 and circular portion 14 are, in most places 70 mils (1.8 mm) thick. In embodiments, the thickness of rigid panel 12 and circular portion 14 range between 1 mm and 3 mm thick. Each indented ring 16 is 20 mils (0.5 mm) thick. In embodiments indented rings 16 range from 0.2 mm thick to 1 mm thick. In embodiments indented rings 16 are one-eighth to one-half the thickness of the remainder of portion 14. The joint between circular portion and rigid panel is formed by the elastomeric material interlocking with the more rigid material, as shown in FIG. 2. Panel 12 is formed first and then placed in a mold into which the more elastic material that will form portion 14 is injected, in molten form, intruding into and filling through-holes 50 (FIG. 2) in panel 12, to interlock with it.

Figure 8:
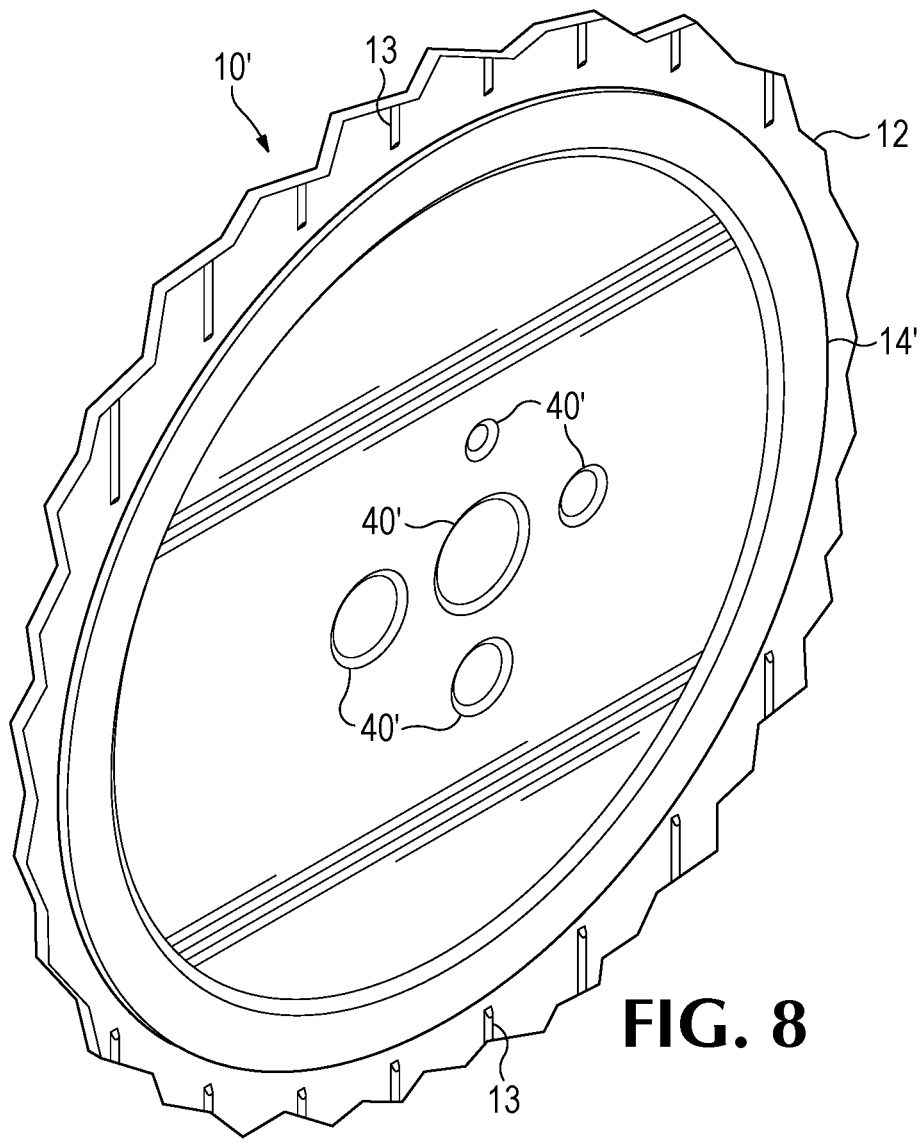
FIG. 8 is an expanded view of the center portion of an alternative embodiment of a flashing piece, adapted to facilitate running cable into a structure.

Referring now to FIG. 8, in an alternative embodiment of a flashing piece 10' center portion 14' does not include concentric rings, but instead has a set of thinned spots 40' for passing a number of cables into a structure while avoiding providing a path for water ingress. In the embodiment shown the thinned spots 40' are different sizes, to accommodate different size cables. In an alternative preferred embodiment spots 40' are all the same size, to accommodate a set of cables that are all the same size. Flashing piece 10' can also accommodate the situation where the installer does not have prior knowledge of the thickness of the cable to be installed at the time in which piece 10' is purchased and taken to a field location. The different size spots 40' can accommodate any one of a number of different cable sizes. Notably, each spot 40' includes the tapering perimeter shown in cross-section in FIG. 2B and discussed in association therewith. In an alternative preferred embodiment, all of the thinned spots 40' are of the same width and are arranged in an even grid, about the center of portion 14'.

The disclosed embodiments are illustrative, not restrictive. While specific configurations of pipe flashing have been described, it is understood that the present invention can be applied to a wide variety of flashing and water blockage. There are many alternative ways of implementing the invention.

What is claimed is:

1. A flashing piece, comprising:
   an outer portion defining an opening, wherein the outer portion comprises a first polymeric material; and
   an inner portion coupled to the outer portion about the opening, wherein the inner portion extends across and covers the opening;
   wherein the inner portion comprises a second polymeric material that is more flexible and elastic than the first polymeric material,
   wherein the inner portion in most places comprises a first thickness,
   wherein the inner portion further defines one or more concentric indented rings each comprising a second thickness,
   wherein the second thickness is thinner than the first thickness to enable an installer to begin a tear by broaching a selected one of the one or more concentric indented rings,
   wherein the inner portion further defines an indentation disposed within an annulus between a pair of the concentric indented rings, and
   wherein the indentation is configured to be broached to form a through-hole configured to receive a grounding wire.

2. The flashing piece of claim 1, wherein said outer portion includes raised features that collectively form down channels for unobstructed water flow.

3. The flashing piece of claim 2, wherein said raised features are vertically oriented raised ribs.

4. The flashing piece of claim 1, further wherein said inner portion defines more than two of said indented rings.

5. The flashing piece of claim 1, wherein said outer portion is made of polymeric material.

6. The flashing piece of claim 1, wherein said outer portion is made of one material taken from a group consisting essentially of polyvinyl chloride and polyamide.

7. The flashing piece of claim 1, wherein each said indented ring is between 0.2 mm thick and 1.0 mm thick.

8. The flashing piece of claim 1, wherein said inner portion is generally between 1 mm thick and 3 mm thick.

9. The flashing piece of claim 1, wherein each said indented ring is between one-eighth and one-half the first thickness of the inner portion.

10. A method of installing a pipe through a hole in a wall, the method comprising:
    partially installing the pipe, such that the pipe has a free end extending through a framing of the wall;
    broaching one of a plurality of concentric indented rings of a flashing piece to form a through-hole extending through the flashing piece, wherein the flashing piece comprises:
       an outer portion defining an opening, wherein the outer portion comprises a first polymeric material; and
       an inner portion coupled to the outer portion about the opening, wherein the inner portion extends across and covers the opening; and
       wherein the inner portion comprises a second polymeric material that is more flexible and elastic than the first polymeric material, wherein the inner portion in most places has a first thickness, wherein the inner portion further defines the plurality of concentric indented rings each having a second thickness less than the first thickness, and wherein the inner portion further defines an indentation disposed within an annulus between a pair of the concentric indented rings;
    placing the through-hole about the pipe and attaching the outer portion to the framing;
    constructing a primary weather barrier about the pipe; and
    broaching the indentation and passing a grounding wire through the indentation.

11. The method of claim 10, wherein said outer portion includes raised features that collectively form down channels for unobstructed water flow.

12. The method of claim 11, wherein said raised features are vertically oriented raised ribs.

13. The method of claim 10, wherein said framing includes sheathing, and wherein a hole is formed in said sheathing to accommodate said pipe.

14. The flashing piece of claim 1, wherein broaching the selected one of the one or more concentric rings is configured to form a second through-hole, and wherein the second through-hole is configured to receive a pipe.

* * * * *